US012468884B1

(12) United States Patent
Ghosh et al.

(10) Patent No.: US 12,468,884 B1
(45) Date of Patent: Nov. 11, 2025

(54) MACHINE LEARNING-BASED ARGUMENT MINING AND CLASSIFICATION

(71) Applicant: Educational Testing Service, Princeton, NJ (US)

(72) Inventors: Debanjan Ghosh, Cambridge, MA (US); Swapna Somasundaran, Plainsboro, NJ (US); Hillary R. Molloy, Charlottesville, VA (US); Avijit Vajpayee, Seattle, WA (US)

(73) Assignee: Educational Testing Service, Princeton, NJ (US)

( * ) Notice: Subject to any disclaimer, the term of this patent is extended or adjusted under 35 U.S.C. 154(b) by 524 days.

(21) Appl. No.: 17/364,074

(22) Filed: Jun. 30, 2021

Related U.S. Application Data (60) Provisional application No. 63/046,770, filed on Jul. 1, 2020.

(51) Int. Cl.
  *G06N 20/00* (2019.01)
  *G06F 16/35* (2025.01)
  *G06F 40/20* (2020.01)
  *G06F 40/216* (2020.01)

(52) U.S. Cl.
  CPC ............ *G06F 40/216* (2020.01); *G06F 16/35* (2019.01); *G06F 40/20* (2020.01); *G06N 20/00* (2019.01)

(58) Field of Classification Search
  CPC ......... G06F 40/216; G06F 16/35; G06F 40/20
  See application file for complete search history.

(56) References Cited

U.S. PATENT DOCUMENTS

| 9,400,779 | B2 * | 7/2016 | Convertino | G06F 40/211 |
| 2018/0218253 | A1 * | 8/2018 | Sen | G06N 20/10 |
| 2019/0138595 | A1 * | 5/2019 | Galitsky | G06F 40/35 |

OTHER PUBLICATIONS

Trautmann, Dietrich et. al., "Fine-grained argument unit recognition and classification." Proceedings of the AAAI Conference on Artificial Intelligence. vol. 34. No. 05. 2020 (Year: 2020).*
P. Suta, et. al, "Matching Question and Answer Using Similarity: An Experiment with Stack Overflow," 2018 IEEE International WIE Conference on Electrical and Computer Engineering (WIECON-ECE), Chonburi, Thailand, 2018, pp. 51-54. (Year: 2018).*
G. Rajendran, P. Poornachandran and B. Chitturi, "Deep learning model on stance classification," 2017 International Conference on Advances in Computing, Communications and Informatics (ICACCI), Udupi, India, 2017, pp. 2407-2409 (Year: 2017).*

(Continued)

*Primary Examiner* — Bhavesh M Mehta
*Assistant Examiner* — Nandini Subramani
(74) *Attorney, Agent, or Firm* — Jones Day (57) ABSTRACT

Computer-based argument mining can be implemented by accessing data comprising text encapsulating a plurality of debates relating to varying topics. Thereafter, the text is parsed into snippets of text containing arguments. Features are then extracted or otherwise derived from pairs of snippets. The features are then used by a transformer network to classify each of the snippets according to one of three categories, the pairs of snippets either being on a same side of a debate or on a different side of the debate. Data is then provided which characterizes the classification. Related apparatus, systems, techniques and articles are also described.

22 Claims, 3 Drawing Sheets

(56) References Cited

OTHER PUBLICATIONS

Sirrianni, Joseph W., Xiaoqing Liu, and Douglas Adams. "Predicting stance polarity and intensity in cyber argumentation with deep bidirectional transformers." IEEE Transactions on Computational Social Systems 8.3 (2021): 655-667. (Year: 2021).*

Musi, Elena, Debanjan Ghosh, and Smaranda Muresan. "ChangeMyView through concessions: Do concessions increase persuasion?. " arXiv preprint arXiv:1806.03223 (2018). (Year: 2018).*

Liu, Xiaoqing,et. al.. "Conflict detection and resolution for product line design in a collaborative decision making environment." Proceedings of the ACM 2012 conference on Computer Supported Cooperative Work. 2012. (Year: 2012).*

Abu-Jbara, Amjad, Diab, Mona, Dasigi, Pradeep, Radev, Dragomir; Subgroup Detection in Ideological Discussions; Proceedings of the 50th Annual Meeting of the Association for Computational Linguistics; Jeju, Republic of Korea; pp. 39-409; Jul. 2012.

Bar-Haim, Roy, Krieger, Dalia, Toledo-Ronen, Orith, Edelstein, Lilach, Bilu, Yonatan, Halfon, Alan, Katz, Yoav, Menczel, Amir, Aharonov, Ranit, Slonim, Noam; From Surrogacy to Adoption; From Bitcoin to Cryptocurrency: Debate Topic Expansion; Proceedings of the 57th Annual Meeting of the Association for Computational Linguistics; Florence, Italy; pp. 977-990; Aug. 2019.

Bilu, Yonatan, Gera, Ariel, Hershcovich, Daniel, Sznajder, Benjamin, Lahav, Dan, Moshkowich, Guy, Malet, Anael, Gavron, Assaf, Slonim, Noam; Argument Invention from First Principles; Proceedings of the 57th Annual Meeting of the Association for Computational Linguistics; Florence, Italy; pp. 1013-1026; Aug. 2019.

Chakrabarty, Tuhin, Hidey, Christopher, Muresan, Smaranda, McKeown, Kathleen, Hwang, Alyssa; Ampersand: Argument Mining for PERSuAsive oNline Discussions; Proceedings of the Conference on Empirical Methods in Natural Language Processing and the 9th International Joint Conference on Natural Language Processing; Hong Kong, China; pp. 2933-2943; Nov. 2019.

Chklovski, Timothy, Pantel, Patrick; VerbOcean: Mining the Web for Fine-Grained Semantic Verb Relations; Proceedings of the 2004 Conference on Empirical Methods in Natural Language Processing; Barcelona, Spain; pp. 33-40; Jul. 2004.

Danescu-Niculescu-Mizil, Cristian, Sudhof, Moritz, Jurafsky, Dan, Leskovec, Jure, Potts, Christopher; A Computational Approach to Politeness with Application to Social Factors; Proceedings of the 51st Annual Meeting of the Association for Computational Linguistics; Sofia, Bulgaria; pp. 250-259; Aug. 2013.

De Marneffe, Marie-Catherine, Manning, Christopher; Stanford Type Dependencies Manual; Technical Report, Stanford University; Sep. 2008.

Devlin, Jacob; Chang, Ming-Wei, Lee, Kenton, Toutanova, Kristina; Bert: Pre-Training of Deep Bidirectional Transformers for Language Understanding; Proceedings of the Conference of the North American Chapter of the Association for Computational Linguistics: Human Language Technologies, vol. 1; Minneapolis, MN; pp. 4171-4186; Jun. 2019.

Farra, Noura, Somasundaran, Swapna, Burstein, Jill; Scoring Persuasive Essays Using Opinions and Their Targets; Proceedings of the 10th Workshop on Innovative Use of NLP for Building Educational Applications; Denver, CO; pp. 64-74; Jun. 2015.

Gardner, Matt, Grus, Joel, Neumann, Mark, Tafjord, Oyvind, Dasigi, Pradeep, Liu, Nelson, Peters, Matthew, Schmitz, Michael, Zettlemoyer, Luke; AllenNLP: A Deep Semantic Natural Language Processing Platform; Proceedings of Workshop for NLP Open Source Software; Melbourne, Australia; pp. 1-6; Jul. 2018.

Habernal, Ivan, Wachsmuth, Henning, Gurevych, Iryna, Stein, Benno; Before Name-Calling: Dynamics and Triggers of Ad Hominem Fallacies in Web Argumentation; Proceedings of the North American Chapter of the Association for Computational Linguistics: Human Language Technologies 2018; New Orleans, LA; pp. 386-396; Jun. 2018.

Ivens, Stephen, Koslin, Bertram; Demands for Reading Literacy Require New Accountability Methods; Touchstone Applied Science Associates; 1991.

Levy, Ran; Gretz, Shai; Sznajder, Benjamin, Hummel, Shay, Aharonov, Ranit, Slonim, Noam; Unsupervised Corpus-Wide Claim Detection; Proceedings of the 4th Workshop on Argument Mining; Copenhagen, Denmark; pp. 79-84; Sep. 2017.

Litman, Diane; Natural Language Processing for Enhancing Teaching and Learning; Proceedings of the 30th AAAI Conference on Artificial Intelligence; pp. 4170-4176; Feb. 2016.

Manning, Christopher, Surdeanu, Mihai, Bauer, John, Finkel, Jenny, Bethard, Steven, McClosky, David; The Stanford CoreNLP Natural Language Processing Toolkit; Association for Computational Linguistics System Demonstration; pp. 55-60; 2014.

Menini, Stefano, Tonelli, Sara; Agreement and Disagreement: Comparison of Points of View in the Political Domain; Proceedings of COLING 2016, the 26th International Conference on Computational Linguistics: Technical Papers; Osaka, Japan; pp. 2461-2470; Dec. 2016.

Musi, Elena, Ghosh, Debanjan, Muresan, Smaranda; ChangeMyView Through Concessions: Do Concessions Increase Persuasion?; arXiv;1806.03223; Jun. 2018.

Pavlick, Ellie, Tetreault, Joel; An Empirical Analysis of Formality in Online Communication; Transactions of the Association for Computational Linguistics, vol. 4; pp. 61-74; 2016.

Pedregosa, Fabian, Varoquaux, Gael, Gramfort, Alexandre, Michel, Vincent, Thirion, Bertrand, Grisel, Olivier, Blondel, Mathieu, Prettenhofer, Peter, Weiss, Ron, Dubourg, Vincent, Vanderplas, Jake, Passos, Alexandre, Cournapeau, David, Brucher, Matthieu, Perrot, Matthieu, Duchesnay, Edouard; Scikit-learn: Machine Learning in Python; Journal of Machine Learning Research, 12; pp. 2825-2830; 2011.

Pennington, Jeffrey, Socher, Richard, Manning, Christopher; GloVe: Global Vectors for Word Representation; Proceedings of the Conference on Empirical Methods in Natural Language Processing; pp. 1532-1543; 2014.

Rosenthal, Sara, McKeown, Kathleen; I Couldn't Agree More: The Role of Conversational Structure in Agreement and Disagreement Detection in Online Discussions; Proceedings of the 16th Annual Meeting of the Special Interest Group on Discourse and Dialogue; Prague, Czech Republic; pp. 168-177; Sep. 2015.

Shnarch, Eyal, Alzate, Carlos, Dankin, Lena, Gleize, Martin, Hou, Yufang, Choshen, Leshem, Aharonov, Ranit, Slonim, Noam; Will It Blend? Blending Weak and Strong Labeled Data in a Neural Network for Argumentation Mining; Proceedings of the 56th Annual Meeting of the Association for Computational Linguistics (Short Papers); Melbourne, Australia; pp. 599-605; Jul. 2018.

Stab, Christian, Gurevych, Iryna; Identifying Argumentative Discourse Structures in Persuasive Essays; Proceedings of the 2014 Conference on Empirical Methods in Natural Language Processing (EMNLP); Doha, Qatar; pp. 46-56; Oct. 2014.

Stede, Manfred, Schneider, Jodi; Argumentation Mining; Synthesis Lectures on Human Language Technologies, 11(2); pp. 1-191; Dec. 2018.

Tan, Chenhao, Niculae, Vlad, Danescu-Niculescu-Mizil, Cristian, Lee, Lillian; Winning Arguments: Interaction Dynamics and Persuasion Strategies in Good-Faith Online Discussions; Proceedings of the 25th International Conference on World Wide Web; pp. 613-624; Apr. 2016.

Vaswani, Ashish, Shazeer, Noam, Parmar, Niki, Uszkoreit, Jakob, Jones, Llion, Gomez, Aidan, Kaiser, Lukasz, Polosukhin, Illia; Attention Is All You Need; 31st Conference on Neural Information Processing Systems; Long Beach, CA; pp. 5998-6008; 2017.

Walker, Marilyn, Anand, Pranav, Fox Tree, Jean, Abbott, Rob, King, Joseph; A Corpus for Research on Deliberation and Debate; Proceedings of the 8th International Conference on Language Resources and Evaluation; Istanbul, Turkey; pp. 812-817; May 2012.

* cited by examiner

MACHINE LEARNING-BASED ARGUMENT MINING AND CLASSIFICATION

RELATED APPLICATION

This application claims priority to U.S. Pat. App. Ser. No. 63/046,770 filed on Jul. 1, 2020, the contents of which are hereby fully incorporated by reference.

TECHNICAL FIELD

The subject matter described herein relates to techniques for identifying and characterizing argumentative structures using machine learning.

BACKGROUND

Argument mining focuses on the detection of argumentative components and argumentative structures in text. A key subtask in argument mining research is to identify the relationship between the argument components, such as identifying agreement and disagreement. Automatic detection of agreement and disagreement from online discussion forums such as the Internet Argument Corpus can augment understandings of specific conversation contexts that spark conflicts and how such conflicts are resolved in the discourse. Likewise, conflicting perspectives also appear where there are no direct interactions between users. For example, Debatepedia is an online encyclopedia of debates that has curated pro and con arguments on controversial topics and critical issues, such as gun control, climate change, and so on. In Debatepedia, authors of the pro and con arguments do not have direct interactions. Instead, they choose a side (e.g., whether background checks for guns are good) and support their stance with arguments.

Argumentation in non-threaded settings is more about making valid claims and supporting them with factual evidence rather than merely expressing one's own opinions on the subject matter or dismissing others by ad-hominem attacks. This type of argumentation is useful to social scientists and historians and also for educational applications that teach and evaluate students' critical thinking and argumentation.

SUMMARY

In a first aspect, computer-based argument mining can be implemented by accessing data comprising text encapsulating a plurality of debates relating to varying topics. Thereafter, the text is parsed into snippets of text containing arguments. Features are then extracted or otherwise derived from pairs of snippets. The features are then used by a transformer network to classify each of the snippets according to one of three categories, the pairs of snippets either being on a same side of a debate or on a different side of the debate. Data is then provided which characterizes the classification.

The providing data if data can include one or more of: displaying the data in an electronic visual display, loading the data in memory, storing the data in physical persistence, or transmitting the data to a remote computing system.

The transformer network can be a bi-directional transformer based architecture that is trained to identify arguments and relations.

The transformer network can be trained using a corpus of debate text in which snippets are annotated into agree, disagree, and neutral categories. The corpus can be generated by measuring cosine similarity between all topics within the debates, selecting a median topic set based on the measured cosine similarities, and generating training snipped pairs by coupling snippets within the median topic set with a randomly selected snippet from the median topic set.

At least a subset of the snippets can be directed to out-of-domain topics for which the transformer network has not been trained.

The transformer network can be first trained using a first corpus and is subsequently fine-tuned using a second, different corpus.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced computer-based argument mining in non-threaded discourse which is particularly helpful in discerning meaning in websites hosting vast amounts of text generated by thousands of users.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to advanced, machine learning-based techniques for determining argumentative relations from debates for argument mining applications with a particular emphasis on non-threaded discourse. A majority of the research has assumed binary perspectives (e.g., agree/disagree relations) and have conducted in-domain and in-genre experiments, thereby limiting its scope for the real-world applications that often involve out-of-domain and out-of-genre datasets. With the current subject matter, the Debatepedia corpus was explored by first introducing a neutral category in addition to the agree/disagree binary categories that have been previously applied to this data. Second, experiments were conducted with unseen (i.e., out-of-domain) topics. Third, the concept of "partial agreement" in the Debatepedia corpus was determined, where argumentative stances lack full commitment. Finally, an out-of-genre dataset was experimented on to evaluate the validity and generalization capacity of the machine learning models for argument relation identification. It was determined that transfer learning through fine-tuning language models achieves the best overall F1 scores, but as more constraints are relaxed, the performance drops.

In order to validate the current subject matter, the Debatepedia corpus was explored to analyze argumentative relations. For a well-defined debate topic t, with regard to a specific debate question, the corpus was curated by coupling two snippets (i.e., short text passages that contain arguments) as a pair (henceforth, elements of the pair are denoted as $s_{first}$ and $s_{second}$, respectively) that are on the same side (for agreement) or opposite sides of the debate (for disagreement). It is noted that argumentative relations under specific assumptions were investigated, such as assuming only the binary perspectives (agree/disagree relation) on in-domain arguments thereby limiting its scope for a variety of scenarios that often involve out-of-domain and out-of-genre datasets. With the current subject matter, pragmatic scenarios when these assumptions or constraints are provided.

The following scenarios are addressed:

Each snippet pair either agree or disagree with each other in the corpus (henceforth, $debate_{orig}$). This assumption was relaxed and a neutral relation was established between snippet pairs that carry no explicit argumentative relation.

A method is provided to identify argument relations between snippet pairs from an unseen out-of-domain topic.

A fine-grained analysis of the argumentative relations was implemented by presenting a new Amazon Mechanical Turk (MTurk) annotation task that annotate partial argument relations.

Finally, in a real-world scenarios, it is realistic to expect to identify conflicting perspectives on topics from a variety of domains and genres, such as news corpus and academic texts. The validity and generalization capacity of machine learning models that are trained on Debatepedia and evaluated on out-of-genre data was identified.

Transfer learning through fine-tuning language models achieves the best overall performances. However, as more constraints are relaxed (e.g., concurrently experiment with out-of-domain data and partial relation), the performance drops.

Datasets. Table 1 shows two pairs of snippets on the debate on animal experimentation and testing (topic: "animal" and title: "animal experimentation and testing"). The pair on the first row agree whereas the snippets on the second row disagree with each other. The final set of snippet pairs in $debate_{orig}$ contains 14,042 pairs marked with agreement relation and 15,312 pair with disagreement.

TABLE 1

Examples of Agreement and Disagreement from $debate_{orig}$ corpus
Debate Topic Name: Animal
Debate Title: Animal experimentation and testing

| Relation | $S_{first}$ | $S_{second}$ |
| --- | --- | --- |
| Agree | Animals are independent creatures that don't exist to serve humans. The other animals eat, use in science, hunt, trap, have a life of their own that is of importance to them apart from their utility to us. | Humans and animals are of one family like brothers and sisters. The perfumes flowers are our sisters; the deer, the horse, the great eagle: these are our brothers. |
| Disagree | Even if we apply the notion of 'dominion', and if we deprive animals of rights, the principle of 'dominion' should be applied in a way that requires humans to see themselves as 'stewards' of animals. | There are certain animals that have evolved with humans, through mutual self-interests in survival, to become 'domesticated' by humans. Our 'dominion' over these animals is certainly biological and evolutionary. |

Since $debate_{orig}$ is created artificially by coupling snippet pairs on different sides of arguments it contains many duplicates that belong to more than one debate topic. For instance, topics "bailout" and "plan" have 15 snippet pairs that are duplicate, which means, in a cross-validation setup an instance of a test snippet pair may already be present in the training partition. However, a majority of the features associated with the corpus are inspired by the presence of topic name in the snippet and its parse tree that result in non-identical feature vectors among the duplicate snippets, thus, (slightly) mitigating the problem. On the contrary, for cross-validation experiments that operate on the full-text snippets (e.g., transformer models), duplicates are needed to be removed from $debate_{orig}$. Thus, between "bailout" and "plan", 7 snippet pairs were randomly assigned to the topic "bailout" and the rest 8 snippet pairs to the topic "plan" where the assignment represents the ratio of occurrence of the number of snippet pairs that belong to "bailout" and "plan" in $debate_{orig}$. After removal of the duplicates the corpus (henceforth, denoted as $debate_{dedup}$) contains 11,931 pairs with agreement relation and 12,984 pairs with disagreement relation.

Two supervised machine learning approaches were utilized for all the experiments we conducted. It is appreciated that other types of machine learning models can be utilized provided that they are properly trained using, for example, a known, labelled corpus. First described is a hand-engineered feature set used in conjunction with a Logistic Regression classifier. Second, the transformer architecture which uses pre-trained language models is described.

Feature Engineering Approaches. Certain features were analyzed to explore how such features perform in case of ternary (e.g., agree/disagree/neutral) classification.

In the current implementation, the Stanford Dependency Parser was used to extract the parse trees. Stanford CoreNLP toolkit was used to acquire sentiment scores for each sentence. Besides the certain features, the following new features were also implemented:

Hedges: Although hedges imply uncertainty, often, their presence makes an argument easier to accept by others. A set of hedges were curated and used as binary features.

Argumentative Discourse Markers: Argumentative claims frequently use discourse markers such as "therefore", "thus", etc. Markers from PDTB were used while temporal markers were discarded.

Opinion expression features: This includes opinions in conjunction with their topical targets for opinion-target pairs. When the opinion in such a pair is replaced by its polarity, it forms target-polarity pairs. Such pairs have been used previously to determine stances in ideological debates and in determining the quality of persuasive essays. With this aspect, target-polarity features were extracted.

SKLL, an open-source Python package that wraps around the Scikit-learn tool was used to perform feature-based experiments. The mean performance of ten fold cross-validation when a Logistic Regression model with $L_2$ penalty is provided below.

Fine-tuned Pre-trained Language Models. Another approach for investigating argumentative relation is to use a transfer learning approach based on pre-trained language model. A bi-directional transformer based architecture (BERT) model can be used to produce excellent performance on argumentation tasks such as argument component and relation identification. BERT is initially trained over a 3.3 billion word English corpus on two tasks: (1) to predict the identity of a particular masked word in a given sentence and (2) given two sentences, to predict whether they are adjacent. With the current subject matter, the input to BERT is a snippet pair, where the elements of the pair are $s_{first}$ and $s_{second}$, respectively, separated by the special "[September]" token. During its training, another special token "[CLS]" is added to the beginning of each training instance. During evaluation (i.e., while predicting argumentative relation) the learned representation for the "[CLS]" token is processed by an additional layer with nonlinear activation.

Description of the parameter tuning for both models (e.g., Logistic Regression and BERT) is provided below.

Logistic Regression experiment: A Logistic Regression model with $L_2$ penalty was employed where the class weights are proportional to the number of instances for the argument relation categories. The regularization strength C was searched over a grid using the dev data. Following values were tried for c, [0.0001, 0.001, 0.01, 0.1, 1, 10, 100, 1000, 10000].

BERT based models: Experiments were executed using different batch size of 8, 16, 32, 48 and finalized on the batch size=48, learning rate of 3e-5) and optimized networks with the Adam optimizer. The $BERlm_{args}$ was trained for 7 epochs and we saved the checkpoint(s) after each epoch. The final $BERTlm_{args}$ (i.e., the model saved after 7 epochs) was used. The training partitions were fine-tuned for 5 epochs with batch size=58. Training was conducted over a K-80 GPU with 48 GB vRAM.

Identification of Ternary Argumentative Relation. With argument relation detection, a ternary classifier can be built that labels argument relations to one of the three categories—agree, disagree, and none/neutral. With the current subject matter, the $debate_{dedup}$ corpus can be updated with the neutral category as per below. First, the cosine-similarity can be measured between all the debate topic names via their GloVe embeddings and for each candidate topic $t_{cand}$, the remaining topics can be ranked by their similarities and the topic set $t_i, \ldots, t_n$ that appear in the median can be selected by similarity scores. Next, snippet pairs can be created by coupling one snippet from $t_{cand}$ (either the $s_{first}$ or $s_{second}$, randomly selected) and a randomly selected snippet from the set of snippets from $t_i, \ldots, t_n$ (either the $s_{first}$ of $s_{second}$). The same count of snippets was maintained for $t_{cand}$ as it presents in the $debate_{dedup}$ corpus. This result in a list of 14,352 pairs of unrelated examples added to $debate_{dedup}$. Pair of snippets from the $debate_{dedup}$ corpus can be classified to one of the three relations, e.g., agree, disagree, or neutral.

Results and Discussions. Results on the $debate_{orig}$ corpus are provided which show that between, Logistic Regression and BERT in Table 2, for both debate orig and $debate_{dedup}$, the pre-trained BERT model ("bert-base-uncased") when fine-tuned on the classification data (denoted as $BERT_{BL}$), performs better than the surface discrete features, with an improvement over 15% for both cases. The macro-F1 averaged over ten fold cross-validation with the exact folds used in both the Logistic Regression and BERT setup for $debate_{orig}$ or $debate_{dedup}$, respectively.

TABLE 2

Evaluations of argumentative relation categories on $debate_{orig}$ and $debate_{dedup}$

| Used Features | $debate_{orig}$ | $debate_{dedup}$ |
|---|---|---|
| Negation + Overlap | 50.83 | 57.59 |
| Entailment | 53.63 | 47.87 |
| Sentiment | 52.35 | 35.88 |
| Cosine | 51.35 | 48.41 |
| Word Embeddings | 59.43 | 41.08 |
| Sentiment + Entailment | 54.23 | 48.72 |
| Sentiment + Entailment + Embeddings | 59.00 | 53.00 |
| Sentiment + Entailment + Embeddings + Cosine | 59.69 | 67.09 |
| Hedge + discourse | 55.04 | 37.22 |
| Opinion_features | 78.98 | 77.76 |
| all features | 82.91 | 85.11 |
| $BERT_{BL}$ | 98.02 | 97.00 |

For $debate_{orig}$, it was noticed that the performances of each feature/feature group are similar to those of conventional techniques. Some differences occur possibly due to the use of different pre-processing tools. In terms of new features, features that capture opinion expressions perform best with an F1 score of 78.98%, improving the overall F1 score to 82.92% for $debate_{orig}$, i.e., almost a 9% absolute improvement over the best state-of-the-arts results.

A couple of differences in the results between $debate_{dedup}$ and $debate_{orig}$ were observed. First, for some feature/feature sets (e.g., textual entailment, sentiment classification) the accuracy drops for $debate_{dedup}$ possibly due to the inclusion of the neutral category. However, this is untrue in which all features are combined, which achieves a 2% macro-F1 improvement for $debate_{dedup}$ over $debate_{orig}$. A careful analysis revealed that this is due to the feature—lemma overlap—that computes lexical overlaps between snippets. As the artificially created neutral category has snippet pairs from two different topics, lemma overlap results in over 90% F1 for the neutral category itself (observe it achieves a 7% improvement for Negation+Overlap feature group in Table 2). To verify this analysis further, an ablation test was conducted with combining all features without the lemma overlap that resulted in a F1 score of 80% for $debate_{dedup}$, indicating a 5% drop.

For each cross-validation setup described in Table 2, each topic was (probably) present in the training and test partitions of the data. The passages below indicate what happens to the performance when tested on unseen (i.e., out-of-domain) topics.

Analysis over Out-of-Domain Topics. In any realistic setting, classification models may encounter snippets from a topic that is absent during training. Thus, to construct such scenario, a total of 15 topics were selected that appear more than 500 times in $debate_{dedup}$ such as "energy", "animal", etc. Separate ternary classifiers were generated in which the topic data is regarded as the test data and the remaining pairs from $debate_{dedup}$ as training. Table 3 presents the results of the experiments. For brevity, in case of the feature engineering approach, only results from only the combination of all features is reported. It is noted that relaxing this constraint results in a large drop in performance. The average macro-F1 over 15 topics is now 55.43%, i.e., a performance drop of over 25% in comparison to Table 2. This establishes the fact that surface features that are mostly designed by the presence of topic names are unable to generalize well. On the contrary, a BERT model that is fine-tuned on the debate$_{dedup}$ (excluding the test set for each topic) performs better (macro-F1 of 76.95%) than discrete features but the performance is still much lower than Table 2. This shows the practical need for creating argumentative relation classifiers that can generalize well even for out-of-domain topics.

TABLE 3

Evaluations of argumentative relation categories on out-of-domain topics

| topic | snippet count | all features | $BERT_{BL}$ | $BERTlm_{args}$ | $BERTlm_{qr}$ |
|---|---|---|---|---|---|
| polygamy | 512 | 50.20 | 89.76 | 80.86 | 85.00 |
| marriage | 523 | 51.35 | 68.67 | 75.43 | 71.57 |
| insurance | 559 | 61.15 | 94.88 | 95.85 | 93.61 |
| power | 565 | 66.27 | 88.16 | 91.78 | 91.06 |
| gas | 572 | 57.11 | 79.96 | 88.42 | 91.93 |
| life | 580 | 69.85 | 85.33 | 85.11 | 88.44 |
| tax | 588 | 51.31 | 55.77 | 59.79 | 59.62 |
| punishment | 603 | 49.50 | 75.49 | 80.67 | 74.70 |
| marijuana | 604 | 56.05 | 75.40 | 72.19 | 77.36 |
| death | 612 | 50.26 | 79.79 | 84.25 | 74.70 |
| weapon | 635 | 51.36 | 58.44 | 71.26 | 69.13 |
| circumcision | 682 | 52.47 | 78.75 | 93.57 | 93.41 |
| health | 1025 | 55.40 | 77.73 | 79.35 | 85.45 |
| energy | 1110 | 60.88 | 85.38 | 88.95 | 90.80 |
| animal | 1440 | 48.33 | 60.81 | 59.33 | 60.96 |
| Average | | 55.43 | 76.95 | 79.65 | 80.52 |

Transfer learning was applied by fine-tuning on a domain-specific corpus. The language model of BERT was fine-tuned on the arguments from the "args.me" corpus that comprises of almost 400K arguments (i.e., around 675K sentences). Henceforth, this model is denoted as BERTlm$_{args}$. Next, the fine-tuned model (denoted as BERTlm$_{qr}$) was trained on a very large corpus to identify relations between argument components between Reddit posts. It was noticed that both BERTlm$_{args}$ and BERTlm$_{qr}$ perform better than the pre-trained BERT with an absolute gain of 3-4% of F1. This confirms that domain-specific language-model pre-training is beneficial to identify argumentative relations even when the topics are absent from the training corpus.

Measuring Partial Argumentative Relations. It is always possible that even when a snippet pair are on the same/different side of a debate topic in debate$_{orig}$, they are not in perfect agreement/disagreement-they may agree (or disagree) on one aspect and be ambivalent on others. One-hundred random snippet pairs from the corpus were examined and it was noted that many pairs in the corpus indicate a partial agreement relation rather than a complete agreement or disagreement. In Table 4, the snippet pairs partially agree/disagree with each other instead of agree/disagree completely. To further investigate, an AMAZON MECHANICAL TURK (MTurk) annotation task was implemented in which Turkers were asked to annotate snippet pairs from one of the four categories: partially agree/disagree, complete agree, complete disagree, and neutral. Note, partial agree, and partial disagree were conflated into one category for mainly the reason that there is more interest in evaluating the absolute vs. partial-ness of the argumentative relations rather in any particular type (i.e., partial agree vs. partial disagree). A couple of examples of partial and complete agree/disagree relations were included while providing detailed instructions to the Turkers. Each HIT comprised five snippet pairs, and seven qualified Turkers (10K approved HITs) were engaged to annotate, paid 50 cents/HIT, and gave 60 minutes/HIT to complete. For the annotation task, a mix of snippet pairs from debate$_{dedup}$ were selected consisting of agree relations (4,000 pairs) and disagree relations (4,000 pairs). 2,000 snippet pairs marked with neutral relation from debate$_{dedup}$ were also included to evaluate (as a sanity check) whether the artificially created neutral pairs are always truly neutral.

TABLE 4

Examples of partial agreement and disagreement from debate$_{orig}$ corpus

| Relation | $S_{first}$ | $S_{second}$ |
|---|---|---|
| Partial Agree | Artificial life hold major benefits for humanity. It (Synthetic biology) promises better drugs, less thirsty crops, greener fuels and even a rejuvenated chemical industry. | Dangers of making organisms will be largely unknowable. Not a good reason to stop if the expected benefits are significant. But it means we need robust regulation. |
| Partial Disagree | First amendment protects right to build ground zero mosque. This building is private property, the owners have a right to use the building as a house of worship. | The Center have every right to build at this site, and may even have chosen the site to send a positive message. But ultimately this is a question of what is right. |

Analysis of the Annotated Data. To quantify Turkers' intuitions about argument relations (i.e., fully committed vs. partial) the inter-annotator agreement (IAA) between the Turkers was measured. For this measurement, one Turker was randomly selected as the label of Annotator 1 and the mean label of the other 6 annotators, rounded to the nearest integer, was selected to be the label of Annotator 2. Next, Cohen's K was computed for these two simulated annotators. This process was repeated 1,000 times and the median and 95% confidence interval were reported. First, the agree, disagree, and partial cases were combined to related and K was measured between related and neutral categories. A reasonably high K of 0.8±0.05 was obtained. Next, IAA was measured between the four categories agree, disagree, partial, and neutral that resulted in a satisfactory K of 0.6±0.03. Table 5 presents the confusion matrix between the original labels from debate$_{dedup}$ (in rows) and the Turker-annotated labels (in columns). The most common label among the given 7 annotations/snippet pair was selected while breaking the tie randomly if there is no clear majority.

TABLE 5

Confusion matrix between gold (row) and Turkers' (columns) annotations.

| Relation | Agree | Disagree | Partial | Neutral |
|---|---|---|---|---|
| Agree | 3010 | 270 | 634 | 91 |
| Disagree | 247 | 3181 | 520 | 57 |
| Neutral | 1 | 1 | — | 2003 |

For the original agree and disagree relations around 16% and 13% were annotated as partial category, respectively. In addition, around 6% and 5%, of the agree and the disagree categories were annotated as disagree and agree, respectively, indicating it is a difficult task for human to make a judgement on argument relation between snippet pair(s) in isolation outside the context of a full debate setup. For neutral category, the artificially created snippet pairs from different topics were annotated as almost always unrelated.

Figure 1:
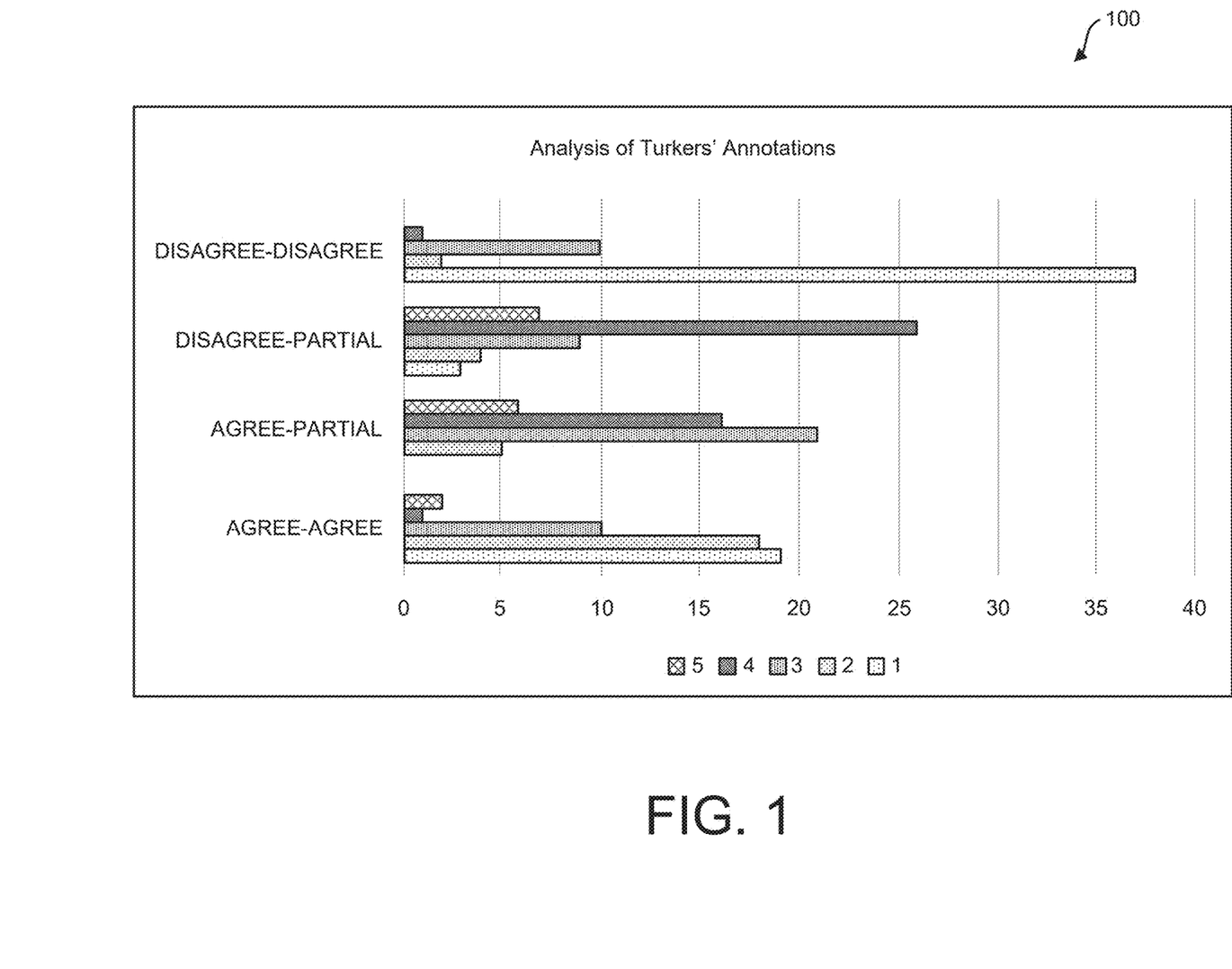
FIG. 1 is a diagram illustrating analysis by expert annotators for four particular combinations of snippet pairs.

Since around 30% of the original agree and disagree relation examples were deemed as either partial or other categories a qualitative analysis of such examples was conducted. Two expert annotators were employed to conduct a data-driven bottom-up analysis of the Turkers' annotations. The annotators annotated a total of 200 snippet pairs (denoted as qual set) from four combinations (50 pairs each); (a) both original and the human-annotated labels are agree, (b) and (c) human-annotated labels are partial when the original labels are agree or disagree, respectively, and (d) both the original and the human-annotated labels are disagree. With reference to diagram 100 of FIG. 1, from the bottom-up analysis, the annotators discovered the following characteristics of the annotations: (1) overall stance and the argumentative content of the snippets is agree/disagree. (2) overall stance of the snippet pair is agree/disagree and some arguments from the snippet pair may agree/disagree, too. (3) overall stances of the two snippets agree/disagree but the evidences and arguments are vastly different. (4) overall stance agree/disagree and some arguments disagree/agree, respectively. (5) Perspective relationship cannot be determined or is unclear.

It was observed that the Turkers' annotations were identical to the gold labels the (1) and the (2) characteristics from the above list are in majority. On the contrary, instances for which the Turkers annotated differently with partial labels (denoted as "Disagree/Agree-Partial" in FIG. 1) are marked predominantly with the (3) and (4) characteristics—i.e., either the pieces of evidence in the snippets are different or contain both sides of agreement (i.e., examples in Table 4). A distinction was observed between the two types where the gold and Turkers' labels are identical. In disagreement, the number of pairs where the overarching stance as well as the arguments, are identical, was much higher than the cases of agreement, whereas in agreement, individually each snippet may contain a variety of arguments on different topics where, in some, the snippets disagree, but they agree on the overall stance.

Identification of Partial Relations. With the current subject matter, partial relations were identified in addition to the original three relations. Another discrete feature was included to identify the partial-ness in the snippets this time. It was found that the majority of the snippets that are considered to represent partial relations contain argumentative concessions marked by discourse markers such as "but", 'however", etc. Twenty such markers were collected and binary features were created which were based on the occurrence of such concession markers. Next, using an antonym list, it was identified whether any pair of antonyms exist where one element of the pair appears before and another element appears after the concession marker. This feature can capture situations where the sentiment alters before/after the markers expressing a partial agree/disagree. Table 6 shows that adding this nuanced constraint of identification of the partial argumentative relation further pushes down the performance. Now the average macro-F1 (i.e., measured across four categories of agree, disagree, partial, and neutral) from discrete features is slightly lower than 50.4%, while without the Partial Argument feature the performance is 49.00%. Even the different variations of BERT models now perform in the mid-60 s. In general, it was observed that the accuracy of identifying the partial cases is low.

TABLE 6

Evaluations over the snippet pairs annotated by the Turkers

| topic | snippet count | all features | BERT$_{BL}$ | BERTlm$_{args}$ | BERTlm$_{qr}$ |
|---|---|---|---|---|---|
| polygamy | 98 | 48.01 | 69.57 | 64.34 | 61.24 |
| marriage | 232 | 51.41 | 56.09 | 58.82 | 55.96 |
| insurance | 191 | 55.13 | 66.40 | 71.65 | 76.67 |
| power | 206 | 53.79 | 62.29 | 64.21 | 64.78 |
| gas | 234 | 52.10 | 65.00 | 63.90 | 71.58 |
| life | 211 | 51.81 | 60.17 | 54.99 | 58.70 |
| tax | 253 | 50.42 | 58.83 | 62.27 | 52.78 |
| punishment | 253 | 49.60 | 66.86 | 70.69 | 78.42 |
| marijuana | 250 | 46.85 | 59.90 | 67.22 | 70.81 |
| death | 186 | 52.20 | 55.03 | 55.67 | 53.70 |
| weapon | 250 | 48.50 | 60.46 | 50.03 | 58.93 |
| circumcision | 296 | 46.85 | 60.45 | 60.83 | 93.41 |
| health | 440 | 49.60 | 66.34 | 66.78 | 66.84 |
| energy | 443 | 48.82 | 64.34 | 67.00 | 66.43 |
| animal | 585 | 45.45 | 50.77 | 52.06 | 60.96 |
| Average | | 50.04 | 61.50 | 63.95 | 66.08 |

Argumentative Relation Identification from Out-of-genre Corpora. It can be useful to discover whether out-of-genre content, i.e. academic texts or news articles disagree with each other on contentious (gun control) or social (efficacy of wearing a mask during pandemic) topics with factual evidences. A final constraint relaxation to experiment with one unlabeled corpus was conducted: TASA that is used to develop the educator's word frequency guide. TASA contains around 45K text passages on a broad variety of texts, novels, newspaper articles, etc.

Given that text passages in TASA corpus are not labeled with argument relations or topics, passages that at least belong to the debate topics of interest were identified. Thus, in order to avoid $O(n^2)$ comparisons over the entire corpus, indexes were built over the TASA corpus using Whoosh-a search engine library. Next, from each of the 15 topics (as provided above), a random set of 10 text snippets from debate$_{dedup}$ was chosen and using the snippets as query the indexes were searched to discover related passages from the TASA corpus. Whoosh has implemented the Okapi BM25 ranking function to estimate the relevance of TASA passages to a given search snippet (query). For each retrieved snippet, the top 10 search results from TASA were chosen and then out of all the search results, a random set of total 10 TASA passages were selected for each topic. Finally, similar to the experiments described above, for each topic, snippet pairs were created by artificially coupling any two TASA passages. This way, for each topic, 45 (i.e., n*(n−1)/2) unique passage pairs for evaluation were created, resulting in the total test set of 675 (from 15 topics) pairs.

The BERTlm$_{qr}$ models that are trained on four argumentative relations/topic (Table 6) were used to identify relations between the TASA passages. Almost 70% of the passage pairs were predicted as neutral due in part to the passages in TASA being collected from a variety of sources that are not always argumentative. Next, MTurk experiments were conducted to evaluate the performance of BERTlm$_{qr}$ model (using a setup similar that described above). Table 7 presents the confusion matrix between the output from BERTlm$_{qr}$ (rows) and the MTurk annotations (columns; Turkers annotated 200 passage pairs). We select the majority label among the 7 annotations/passage pair while breaking the tie randomly needed. A high number of partial predictions in Table 7 depicts the fact that unlike Debatepedia, TASA passages do not concretely agree/disagree on specific claims. Also, the low accuracy of disagree (i.e., many instances are annotated as partial) shows it is a hard problem to classify argumentative relations from out-of-genre corpus.

TABLE 7

Confusion matrix between BERTlm$_{qr}$ and MTurk annotations on TASA passage pairs.

| Relation | Agree | Disagree | Partial | Neutral |
| --- | --- | --- | --- | --- |
| Agree | 32 | 0 | 19 | 4 |
| Disagree | 6 | 11 | 17 | 4 |
| Partial | 3 | 0 | 55 | 30 |
| Neutral | 1 | 1 | 4 | 13 |

Figure 2:
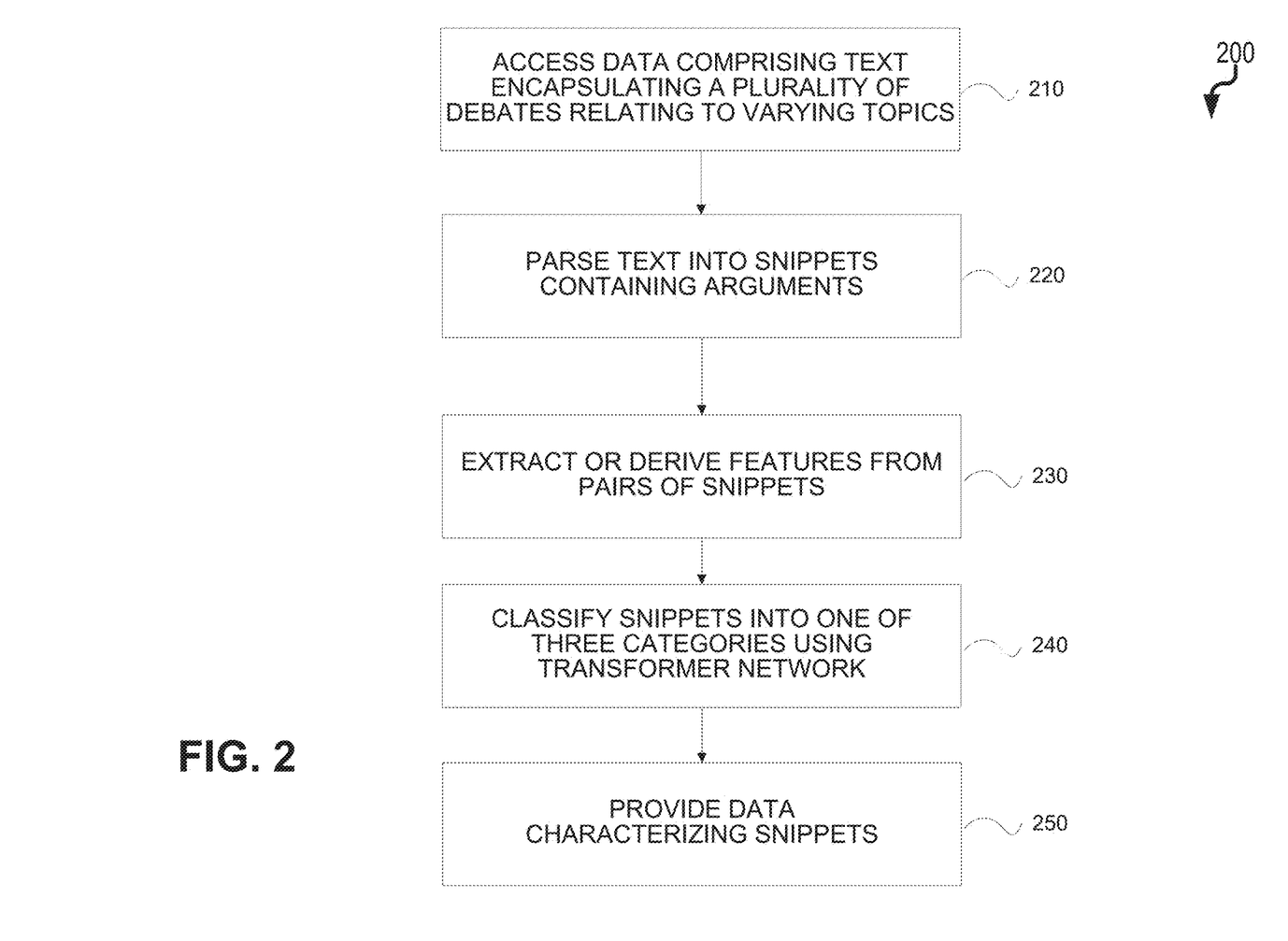
FIG. 2 is a process flow diagram illustrating machine learning-based argument mining and classification.

FIG. 2 is a diagram 200 in which computer-based argument mining can be implemented, at 210, by accessing data comprising text encapsulating a plurality of debates relating to varying topics. Thereafter, at 220, the text is parsed into snippets of text containing arguments. Features are then extracted or otherwise derived, at 230, from pairs of snippets. The features are then used, at a 240, by a transformer network to classify each of the snippets according to one of three categories, the pairs of snippets either being on a same side of a debate or on a different side of the debate. Data is then provided, at 250, which characterizes the classification.

Figure 3:
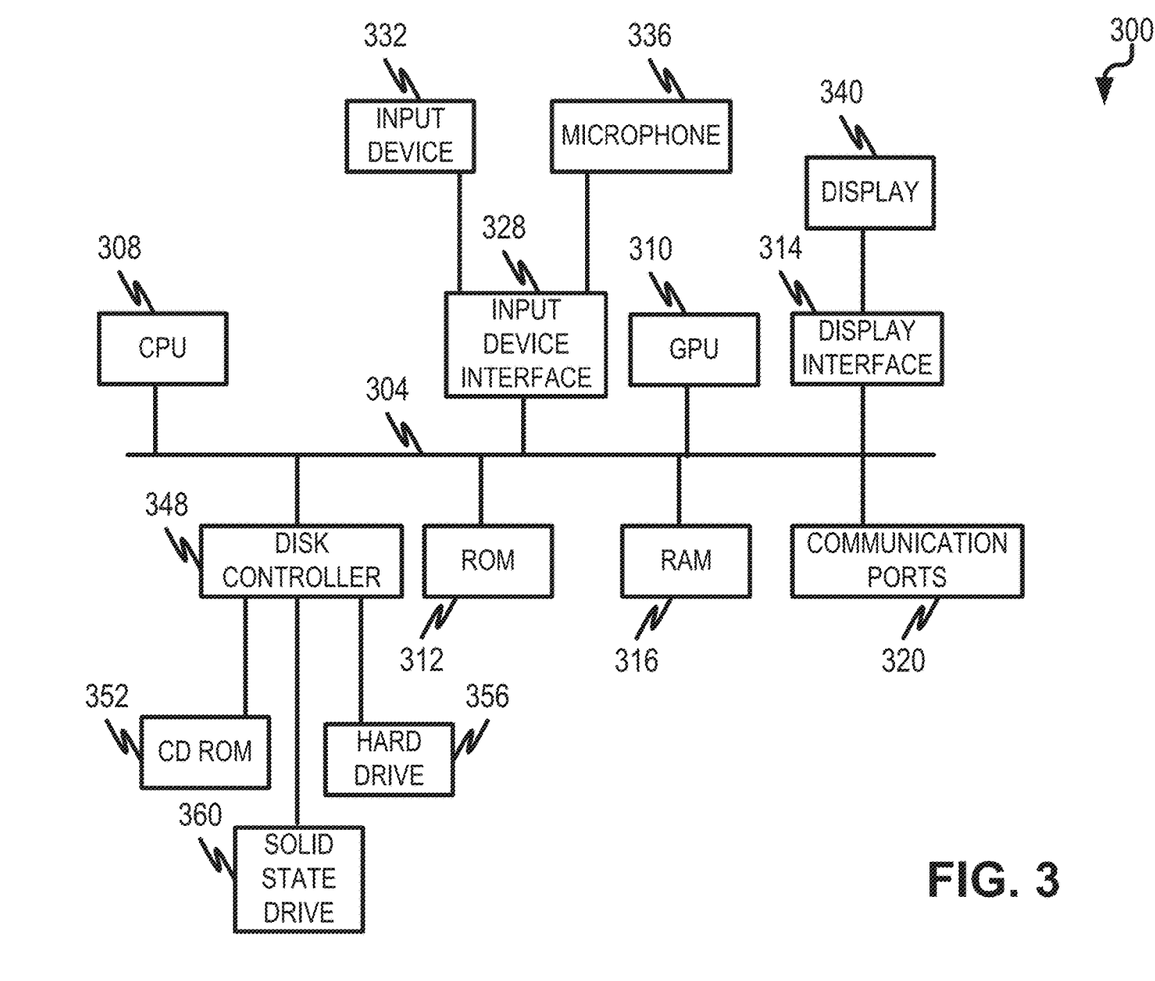
FIG. 3 is a diagram of a computing device for implementing aspects of the current subject matter.

FIG. 3 is a diagram 300 illustrating a sample computing device architecture for implementing various aspects described herein. A bus 304 can serve as the information highway interconnecting the other illustrated components of the hardware. A processing system 308 labeled CPU (central processing unit) (e.g., one or more computer processors/data processors at a given computer or at multiple computers), can perform calculations and logic operations required to execute a program. Additionally or alternatively, a processing system 310 labeled GPU (graphical processing unit) can perform calculations and logic operations required to execute a program. A non-transitory processor-readable storage medium, such as read only memory (ROM) 312 and random access memory (RAM) 316, can be in communication with the processing system 308 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 348 can interface with one or more optional disk drives to the system bus 304. These disk drives can be external or internal floppy disk drives such as 360, external or internal CD-ROM, CD-R, CD-RW or DVD, or solid state drives such as 352, or external or internal hard drives 356. As indicated previously, these various disk drives 352, 356, 360 and disk controllers are optional devices. The system bus 304 can also include at least one communication port 320 to allow for communication with external devices either physically connected to the computing system or available externally through a wired or wireless network. In some cases, the at least one communication port 320 includes or otherwise comprises a network interface.

To provide for interaction with a user, the subject matter described herein can be implemented on a computing device having a display device 340 (e.g., a CRT (cathode ray tube) or LCD (liquid crystal display) monitor) for displaying information obtained from the bus 304 via a display interface 314 to the user and an input device 332 such as keyboard and/or a pointing device (e.g., a mouse or a trackball) and/or a touchscreen by which the user can provide input to the computer. Other kinds of input devices 332 can be used to provide for interaction with a user as well; for example, feedback provided to the user can be any form of sensory feedback (e.g., visual feedback, auditory feedback by way of a microphone 336, or tactile feedback); and input from the user can be received in any form, including acoustic, speech, or tactile input. The input device 332 and the microphone 336 can be coupled to and convey information via the bus 304 by way of an input device interface 328. Other computing devices, such as dedicated servers, can omit one or more of the display 340 and display interface 314, the input device 332, the microphone 336, and input device interface 328.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for argument mining comprising:
    training a transformer network on a corpus of debate text generated by measuring cosine similarity between all topics within the debates, selecting a median topic set based on the measured cosine similarity, and forming training snippet pairs from within the median topic set;
    accessing data comprising text encapsulating a plurality of debates relating to varying topics;
    parsing the text into snippets of text containing arguments;
    extracting or deriving features from pairs of snippets, the pairs of snippets either being on a same side of a debate or on a different side of the debate;
    determining, by a transformer network using the features, whether each of a plurality of snippets fully agrees, disagrees, partially agrees, or is neutral, wherein a partial agreement determination is based on agreement on some aspects of the debate but not on other aspects of the debate;
    classifying each of a plurality of snippets based on said determining; and
    providing data characterizing the classifying.

2. The method of claim 1, wherein the providing data comprises one or more of: displaying the data in an electronic visual display, loading the data in memory, storing the data in physical persistence, or transmitting the data to a remote computing system.

3. The method of claim 1, wherein the transformer network comprises a bi-directional transformer based architecture that is trained to identify arguments and relations.

4. The method of claim 1
    wherein the corpus of debate text comprises snippets annotated into fully agree, disagree, partially agree, and neutral categories.

5. The method of claim 4, wherein the
    training snippet pairs are formed by coupling snippets within the median topic set with a randomly selected snippet from the median topic set.

6. The method of claim 1, wherein at least a subset of the snippets are directed to out-of-domain topics for which the transformer network has not been trained.

7. The method of claim 1, wherein the transformer network is first trained using a first corpus and is subsequently fine-tuned using a second, different corpus.

8. The method of claim 1, wherein the partial agreement determination is based on concession markers comprising one or more of "but" and "howeve".

9. The method of claim 8, wherein the partial agreement determination is further based on presence of an antonym pair, wherein the antonym pair comprises one element of the pair appearing before the concession marker and one appearing after.

10. A system for argument mining comprising:
    at least one data processor; and
    memory storing instructions which, when executed by the at least one data processor, result in operations comprising:
        training a transformer network on a corpus of debate text generated by measuring cosine similarity between all topics within the debates, selecting a median topic set based on the measured cosine similarity, and forming training snippet pairs from within the median topic set;
        accessing data comprising text encapsulating a plurality of debates relating to varying topics;

parsing the text into snippets of text containing arguments;

extracting or deriving features from pairs of snippets, the pairs of snippets either being on a same side of a debate or on a different side of the debate;

determining, by a transformer network using the features, whether each of a plurality of snippets fully agrees, disagrees, partially agrees, or is neutral, wherein a partial agreement determination is based on agreement on some aspects of the debate but not on other aspects of the debate;

classifying each of a plurality of snippets based on said determining; and providing data characterizing the classifying.

11. The system of claim 10, wherein the providing data comprises one or more of: displaying the data in an electronic visual display, loading the data in memory, storing the data in physical persistence, or transmitting the data to a remote computing system.

12. The system of claim 10, wherein the transformer network comprises a bi-directional transformer based architecture that is trained to identify arguments and relations.

13. The system of claim 10, wherein the corpus of debate text comprises snippets annotated into fully agree, disagree, partially agree, and neutral categories.

14. The system of claim 13, wherein the
training snippet pairs are formed by coupling snippets within the median topic set with a randomly selected snippet from the median topic set.

15. The system of claim 10, wherein at least a subset of the snippets are directed to out-of-domain topics for which the transformer network has not been trained.

16. The system of claim 10, wherein the transformer network is first trained using a first corpus and is subsequently fine-tuned using a second, different corpus.

17. A computer-implemented method for argument mining comprising:
training a transformer network on a corpus of debate text generated by measuring cosine similarity between all topics within the debates, selecting a median topic set based on the measured cosine similarity, and forming training snippet pairs from within the median topic set;

accessing data comprising text encapsulating a plurality of debates relating to varying topics;

parsing the text into snippets of text containing arguments;

extracting or deriving features from pairs of snippets, the pairs of snippets either being on a same side of a debate or on a different side of the debate;

determining, by a transformer network using the features, whether each of a plurality of snippets fully agrees, disagrees, partially agrees, or is neutral, wherein a partial agreement determination is based on agreement on some aspects of the debate but not on other aspects of the debate;

classifying each of a plurality of snippets based on said determining; and providing data characterizing the classifying and identifying.

18. The method of claim 17, wherein the providing data comprises one or more of: displaying the data in an electronic visual display, loading the data in memory, storing the data in physical persistence, or transmitting the data to a remote computing system.

19. The method of claim 17
wherein the corpus of debate text comprises snippets annotated into fully agree, disagree, partially agree, and neutral categories.

20. The method of claim 19, wherein the
training snippet pairs are formed by coupling snippets within the median topic set with a randomly selected snippet from the median topic set.

21. The method of claim 17, wherein at least a subset of the snippets are directed to out-of-domain topics for which the transformer network has not been trained.

22. The method of claim 17, wherein the transformer network is first trained using a first corpus and is subsequently fine-tuned using a second, different corpus.

* * * * *